(12) United States Patent
Reimann et al.

(10) Patent No.: US 10,922,979 B2
(45) Date of Patent: Feb. 16, 2021

(54) METHODOLOGY OF COORDINATING AN EMERGENCY BRAKING OF A PLATOON OF COMMUNICATIVELY-COUPLED TRANSPORTATION VEHICLES

(71) Applicant: VOLKSWAGEN AG, Wolfsburg (DE)

(72) Inventors: Daniel Reimann, Braunschweig (DE); Roman Alieiev, Stendal (DE); Ahmad El Assaad, Wolfsburg (DE); Guillaume Jornod, Berlin (DE)

(73) Assignee: Volkswagen AG

( * ) Notice: Subject to any disclaimer, the term of this patent is extended or adjusted under 35 U.S.C. 154(b) by 0 days.

(21) Appl. No.: 16/016,044

(22) Filed: Jun. 22, 2018

(65) Prior Publication Data
US 2018/0374366 A1 Dec. 27, 2018

(30) Foreign Application Priority Data
Jun. 23, 2017 (EP) .................................... 17177684

(51) Int. Cl.
*G08G 1/00* (2006.01)
*G05D 1/02* (2020.01)
(Continued)

(52) U.S. Cl.
CPC .................. *G08G 1/22* (2013.01); *B60T 7/22* (2013.01); *B60T 8/1701* (2013.01);
(Continued)

(58) Field of Classification Search
CPC .... G08G 1/22; G08G 1/162; G08G 1/096741; G08G 1/096791; G05D 1/0293;
(Continued)

(56) References Cited

U.S. PATENT DOCUMENTS

| 9,189,961 B2 | 11/2015 | Mehr et al. |
| 9,423,794 B2 * | 8/2016 | Lind ................... G05D 1/0278 |

(Continued)

FOREIGN PATENT DOCUMENTS

| CN | 103403639 A | 11/2013 |
| CN | 104471624 A | 3/2015 |

(Continued)

OTHER PUBLICATIONS

Dharshan Krishna Murthy and Alejandro Masrur, "Braking in Close Following Platoons: The Law of the Weakest", 2016, 2016 Euromicro Conference on Digital System Design (Year: 2016).*

(Continued)

*Primary Examiner* — Anshul Sood
(74) *Attorney, Agent, or Firm* — Barnes and Thornburg LLP

(57) ABSTRACT

A method for coordinating an emergency braking of a platoon of communicatively-coupled transportation vehicles. In response to an emergency situation, individual braking control settings are centrally determined for one or more transportation vehicles of the platoon by a managing entity managing the platoon. The individual braking control settings are communicated from the managing entity) to the one or more transportation vehicles of the platoon. The one or more transportation vehicles of the platoon brake in accordance with the respective individual braking control settings received from the managing entity.

15 Claims, 3 Drawing Sheets

(51) Int. Cl.
  *B60T 7/22* (2006.01)
  *B60T 8/17* (2006.01)
(52) U.S. Cl.
  CPC ...... *G05D 1/0293* (2013.01); *B60T 2201/022* (2013.01); *B60T 2260/08* (2013.01); *G05D 2201/0213* (2013.01)
(58) Field of Classification Search
  CPC .. G05D 1/0088; G05D 1/0295; G05D 1/0027; B60W 30/17; B60T 7/22; B60T 8/1701
  See application file for complete search history.

(56) References Cited

U.S. PATENT DOCUMENTS

| | | | |
|---|---|---|---|
| 9,494,943 B2 | 11/2016 | Harvey | |
| 2009/0212935 A1* | 8/2009 | Luo | B60Q 9/008 340/467 |
| 2010/0094509 A1* | 4/2010 | Luke | B60W 40/02 701/45 |
| 2011/0125345 A1 | 5/2011 | Parienti | |
| 2015/0170429 A1* | 6/2015 | Denny | B60W 30/09 701/36 |
| 2015/0283985 A1* | 10/2015 | Korthals | B60T 7/22 701/70 |
| 2016/0054735 A1* | 2/2016 | Switkes | G08G 1/22 701/23 |
| 2016/0274590 A1 | 9/2016 | Harvey | |
| 2018/0188725 A1* | 7/2018 | Cremona | G01S 19/13 |

FOREIGN PATENT DOCUMENTS

| | | |
|---|---|---|
| CN | 106708057 A | 5/2017 |
| DE | 102004053933 A1 | 5/2006 |
| DE | 102008026686 A1 | 12/2009 |
| WO | 2012105889 A1 | 8/2012 |
| WO | 2015047181 A1 | 4/2015 |
| WO | 2016134770 A1 | 9/2016 |

OTHER PUBLICATIONS

Office Action for Chinese Patent Application No. 20181065085.8; dated Jul. 14, 2020.

* cited by examiner

METHODOLOGY OF COORDINATING AN EMERGENCY BRAKING OF A PLATOON OF COMMUNICATIVELY-COUPLED TRANSPORTATION VEHICLES

PRIORITY CLAIM

This patent application claims priority to European Patent Application No. 17177684.2, filed 23 Jun. 2017, the disclosure of which is incorporated herein by reference in its entirety.

SUMMARY

Illustrative embodiments relate to autonomous driving in convoys (so-called platoons) and, more particularly, to controlling or coordinating an emergency braking of the transportation vehicles participating in such a platoon.

BRIEF DESCRIPTION OF THE DRAWINGS

Disclosed embodiments of apparatuses and methods will be described in the following by way of example only, and with reference to the accompanying figures, in which.

DETAILED DESCRIPTION

Figure 1:
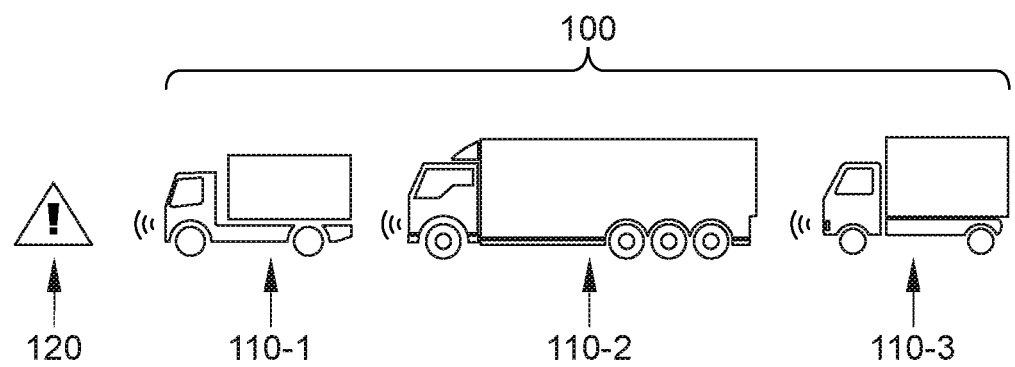
FIG. 1 shows an example platoon of a plurality of at least partially autonomous trucks.

Grouping transportation vehicles into platoons can increase the capacity of roads. Vehicular platoons typically decrease the distances between cars or trucks using electronic coupling. Especially truck platooning is an interesting candidate for the transport sector. Truck platooning comprises a number of trucks equipped with driving support systems (e.g., Adaptive Cruise Control, ACC)—one closely following the other. This forms a platoon with the trucks driven by smart technology, and mutually communicating, e.g., via Car2Car communication technologies. With the following trucks braking immediately, with substantially zero reaction time, platooning can improve traffic safety. Platooning can also be a cost-saver as the trucks drive close together at a constant speed. In High-Density Platooning (HDPL) distances between subsequent trucks can be lower than 10 m, or even lower than 5 m, even for speeds of up to 100 km/h. This means lower fuel consumption and less $CO_2$ emissions. And, lastly, platooning can efficiently boost traffic flows thereby reducing tail-backs. Meanwhile the short distance between transportation vehicles means less space taken up on the road.

In danger or emergency situations especially HDPL requires quick and coordinated braking maneuvers of the participating transportation vehicles which can have substantially differing characteristics, such as weight, load, braking power, etc., influencing their respective braking distance. In HDPL the reaction time for following transportation vehicles is much more critical than in normal platoons, in particular, with regard to emergency braking. Following transportation vehicles have to react instantaneously. A further issue is the inertia of a braking system. Hydraulic braking systems in trucks can have reaction times of up to 700 ms until they reach their full braking effect. The rise of the braking power thereby is exponential.

The present disclosure addresses such coordinated emergency braking maneuvers for vehicular platoons and aims at avoiding or at least reducing collateral damages, such as rear-end collisions.

This is achieved by a method, a system, and a transportation vehicle.

A first disclosed embodiment provides a method for coordinating an emergency braking of a platoon of communicatively-coupled transportation vehicles. The method includes, in response to an emergency situation, determining individual braking control settings for at least one, a plurality, or even each transportation vehicle of the platoon by a managing entity managing or coordinating the platoon. Further, the method includes communicating the individual braking control settings from the managing entity to the at least one, the plurality, or each transportation vehicle of the platoon. The transportation vehicles of the platoon then brake in accordance with their respective individual braking control settings received from the managing entity.

The skilled person having benefit from the present disclosure will appreciate that different transportation vehicles of the platoon have different characteristics and thus different braking distances. Thus, there is a need for individual braking control settings for each transportation vehicle. This method can coordinate the respective braking maneuvers of the participating transportation vehicles by employing a central platoon managing entity providing respective braking control settings for each transportation vehicle. Since the central platoon managing entity has oversight over the platoon and the characteristics of its participating members, the individual emergency braking control settings can be optimized for minimizing collateral damages, such as crashes between participating transportation vehicles.

In some example implementations, the plurality of transportation vehicles of the platoon can be autonomous or at least partially autonomous transportation vehicles, respectively. In a particular implementation, the transportation vehicles can be autonomous trucks. The skilled person having benefit from the present disclosure will appreciate however that the transportation vehicles can also be at least partially autonomous busses, cars, or any other transportation vehicles of interest. Autonomous transportation vehicles are capable of sensing their environment and navigating without human input. Autonomous transportation vehicles can use a variety of techniques to detect and navigate within their surroundings, such as radar, laser light, Global Positioning System (GPS), odometry, and computer vision. Advanced control systems can interpret sensory information to identify appropriate navigation paths, as well as obstacles and relevant signage.

In some example implementations, the plurality of transportation vehicles of the platoon can communicate with each other via one or more vehicle-to-vehicle (V2V) or vehicle-to-infrastructure (V2I) communication systems. V2V and V2I can also be summarized to V2X. V2V refers to a transportation vehicle technology designed to allow transportation vehicles to communicate with each other. V2V or V2I can be based on various underlying wireless technologies, such as different versions of IEEE 802.11 (WiFi), Worldwide Interoperability for Microwave Access (WiMAX), cellular communication systems, or the like. Thus, the transportation vehicles can be equipped with corresponding transmitter and receiver circuitry.

In some example implementations, the managing entity can be a transportation vehicle of the platoon acting as a master transportation vehicle for other transportation vehicles of the platoon acting as slave transportation vehicles. Thus, the managing or coordinating entity can be a transportation vehicle participating in the platoon. It can be the leading transportation vehicle at the head of the platoon, but this is no requirement. Generally, it can be at an arbitrary position in the platoon. Having the managing entity within the platoon can be beneficial for obtaining short communication times and thus reaction times.

In some example implementations, the determined individual braking control settings are indicative of or lead to a respective braking power and/or time to be applied at the respective participating transportation vehicle. Thus, electro-mechanical braking systems of the individual transportation vehicles can be exactly actuated using the individual braking control settings to achieve the respective required braking power and/or time.

In some example implementations, the method can further comprise informing the managing entity about individual characteristics and/or a current state of each transportation vehicle participating in the platoon. This can be done via V2V or V2I communications, for example. In this way, the managing entity can be kept up to date with respect to current transportation vehicle parameters, leading to more accurate individual braking control settings.

Thus, in some example implementations, determining the individual braking settings of a transportation vehicle can be based on the current individual characteristics and/or the current state of the respective transportation vehicle. In other words, an algorithm for generating the respective individual braking settings can use the current individual characteristics and/or the current state of the respective transportation vehicle as input parameters. Thus, the accuracy of the determined individual braking control settings can be increased.

In some example implementations, the individual characteristics and/or the current state can comprise transportation vehicle parameters that are relevant for the emergency braking, for example, for the respective braking distance. Such individual characteristics and/or current states can include at least one of transportation vehicle size (e.g., length, height, width), transportation vehicle weight, transportation vehicle braking power, inter-vehicle-distance, transportation vehicle speed, tire condition(s), etc. Communicating such transportation vehicle parameters to the managing entity allows accurate prediction and coordination of the individual emergency braking maneuvers.

In some example implementations, the method can further include detecting the emergency situation by a transportation vehicle of the platoon and, in response to detecting the emergency situation, broadcasting an emergency message from the detecting transportation vehicle to other transportation vehicles of the platoon. For example, the detecting transportation vehicle can be a transportation vehicle heading the platoon. In some examples, the emergency situation can be detected with an appropriate environmental sensor, such as a radar sensor or the like. For example, the emergency situation may be a sudden appearance of an object or person in close proximity in front of the detecting transportation vehicle. The emergency message can warn all participating transportation vehicles and individual appropriate measures can be prepared (e.g., arming the respective braking system).

In some example implementations, the method can further include, in response to receiving the emergency message from the detecting transportation vehicle, initializing an emergency braking and/or building up braking pressure in the other transportation vehicles of the platoon. In this way, the respective braking pressures can be already build up prior or during the determination of the individual braking control settings by the managing entity. When receiving the respective braking control settings, they can be immediately applied to the respective braking system without any further loss in time.

A further disclosed embodiment provides a system of a plurality of communicatively-coupled transportation vehicles. The system comprises a first transportation vehicle configured to detect an emergency situation and, in response to the detected emergency situation, to broadcast an emergency message to other transportation vehicles. The system further comprises a second transportation vehicle configured to determine, in response to the emergency message, respective braking control parameters for a respective transportation vehicle and to send the respective individual braking control parameters to the respective transportation vehicle. The system further comprises at least a third transportation vehicle configured to adjust its braking settings in accordance with its respective individual braking control parameters received from the second transportation vehicle. The first transportation vehicle can be a transportation vehicle leading or heading the platoon and/or a transportation vehicle experiencing the emergency situation (e.g., a sudden proximate object). The second transportation vehicle can be the managing or coordinating transportation vehicle, also referred to as master transportation vehicle. The third transportation vehicle can be another participating transportation vehicle of the platoon. The skilled person having benefit from the present disclosure will appreciate that the coordinating transportation vehicle can determine its own braking settings as well as the braking settings for all other participating transportation vehicles based on respective characteristics and/or a current state of each transportation vehicle participating in the platoon.

A further disclosed embodiment provides a transportation vehicle comprising memory configured to store individual characteristics and/or current states of other transportation vehicles of a platoon of communicatively-coupled transportation vehicles. The transportation vehicle also comprises a receiver configured to receive an emergency message from another transportation vehicle of the platoon, a processor configured to calculate, in response to the emergency message and based on the stored individual characteristics and/or current state of a transportation vehicle of the platoon, individual braking control parameters for the respective transportation vehicle; and a transmitter configured to transmit the individual braking control parameters to the respective transportation vehicle. The receiver and transmitter can be adapted to an underlying V2V communication technology. The skilled person having benefit from the present disclosure will appreciate that this transportation vehicle can be used to centrally manage or coordinate the platoon and, more particularly, the emergency braking of the whole platoon.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, operations, processes, acts, elements and/or components, but do not preclude the presence or addition of one or more other features, integers, operations, processes, acts, elements, components and/or any group thereof.

Unless otherwise defined, all terms (including technical and scientific terms) are used herein in their ordinary meaning of the art to which the examples belong.

Although the following examples mainly relate to truck platooning, the skilled person having benefit from the present disclosure will easily appreciate that the principles of the present disclosure can be applied to any kind of vehicular platoons, such as car platoons or bus platoons.

FIG. 1 schematically illustrates an example convoy (platoon) 100 comprising multiple different at least partially autonomously driving trucks 110-1, 110-2, 110-3 which are each equipped with driving support systems (e.g., Adaptive Cruise Control, ACC) and are communicatively coupled to each other via one or more wireless V2V communication systems. The skilled person having benefit from the present disclosure will appreciate that the number of trucks participating in the platoon can be arbitrary and that the three trucks are only an illustrative example. Optionally, all trucks 110 of the platoon 100 can mutually communicate with each other. In the example of FIG. 1, truck 110-1 can communicate with each of trucks 110-2 and 110-3, truck 110-2 can communicate with each of trucks 110-1 and 110-3, and truck 110-3 can communicate with each of trucks 110-1 and 110-2.

Truck 110-1 leads the platoon 100 and detects or senses an emergency situation 120 using one or more onboard environmental sensors of its driving support system, such as radar sensors, for example. The emergency situation 120 can be due a sudden appearance of an unexpected object (e.g., a child) in front of truck 110-1, thus requiring a sudden and hefty brake of truck 110-1 and thus also of the following trucks 110-2, 110-3. As explained before, the respective distances between the trucks can be small, for example, less than 10 m, or even less than 5 m. Given a speed of the platoon 100 of, for example, 100 km/h this small inter-truck-distance requires intelligent and coordinated braking maneuvers of the individual participating trucks 110-1, 110-2, 110-3 to avoid collisions. As can be seen from FIG. 1, the participating trucks 110-1, 110-2, 110-3 can be of different size, different weight, different load, can employ different technologies, etc. Thus, the braking behavior of each truck will depend on its individual characteristics. To avoid or at least minimize collateral damages (e.g., collisions between the trucks 110-1, 110-2, 110-3), the present disclosure proposes a concept for coordinating an emergency braking of the platoon 100.

Figure 2:
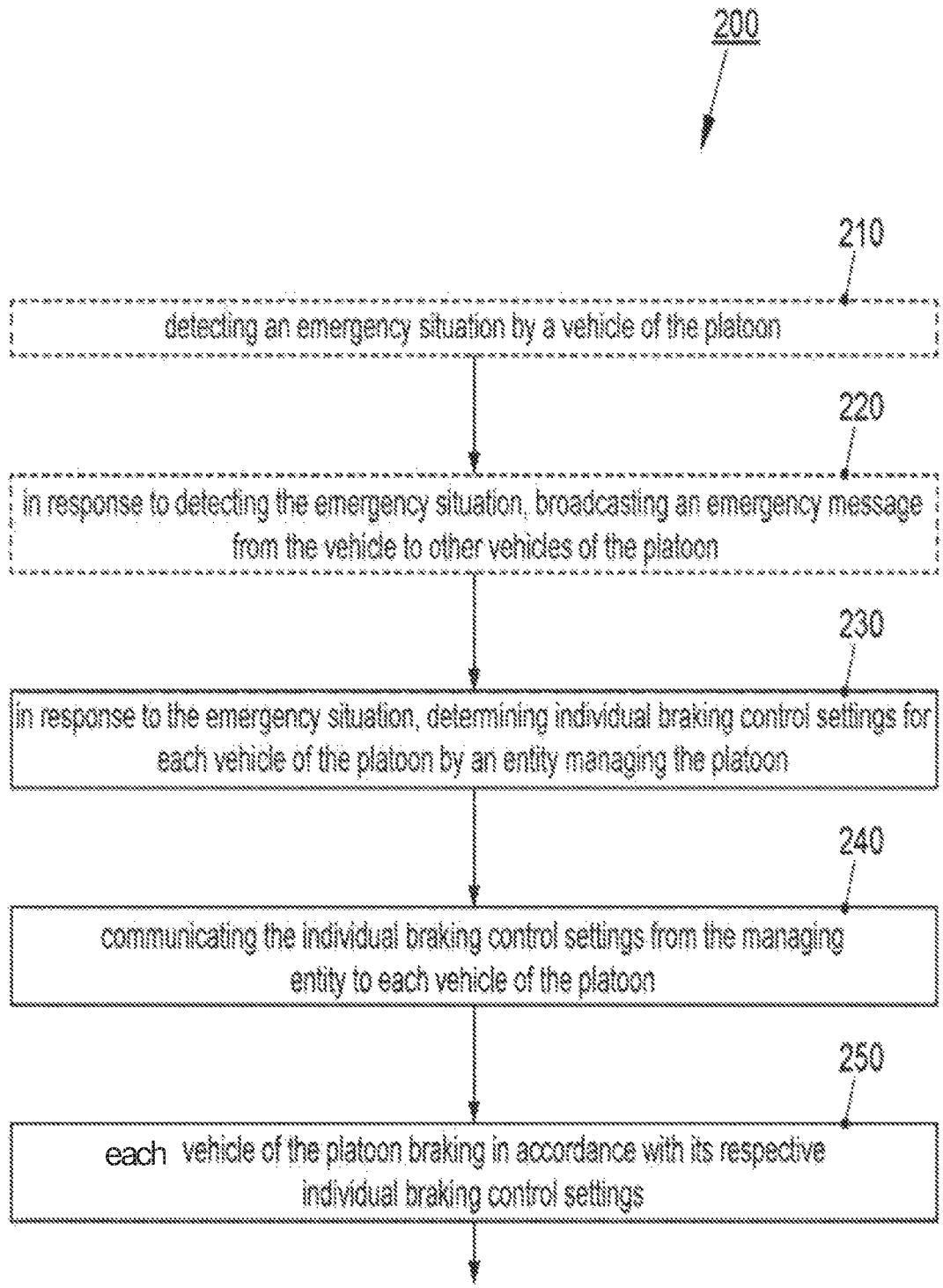
FIG. 2 shows a flowchart of a method for controlling an emergency braking of a platoon of communicatively-coupled transportation vehicles.

A flowchart of a method 200 in accordance with the proposed concept is illustrated in FIG. 2.

Method 200 includes, upon the detected emergency situation 120, determining 230 individual braking control settings/parameters for each truck 110-1, 110-2, 110-3 of the platoon 100 by a central entity managing or coordinating the platoon. In some implementations, the detecting truck 110-1 may optionally determine its braking control settings independently on its own for faster response time and to avoid an obstacle. Apart from that the individual braking control settings/parameters are determined centrally for the platoon members. Note that the managing entity could also be a remote entity, such as a remote server, as long as the communication between the remote entity and the trucks 110-1, 110-2, 110-3 is quick enough (for example, in the order of a few milliseconds). Optionally, the managing entity is or is comprised of a truck participating in the platoon 100. In the example of FIG. 1, the managing entity is truck 110-3 acting a master for the other trucks 110-1 and 110-2, which can consequently be considered slaves. Method 200 further includes communicating 240 the individual braking control settings/parameters from the managing entity (e.g., truck 110-3) to the member trucks of the platoon 100. Note that truck 110-3 will of course also communicate its own braking control settings/parameters to itself, i.e., its braking system. Then, the trucks 110-1, 110-2, 110-3 of the platoon 100 can brake 250 in accordance with its respective individual braking control settings/parameters received from the managing entity (e.g., truck 110-3).

In a basic implementation, the individual braking control settings/parameters for the different trucks 110-1, 110-2, 110-3 may be predetermined fixed settings/parameters that the managing entity (e.g., truck 110-3) may have stored. However, it may be beneficial to determine the individual braking control settings/parameters based on current individual characteristics and/or a current state of each truck 110-1, 110-2, 110-3, which may be updated continuously. For this purpose, method 200 may optionally include (continuously) informing the managing entity (e.g., truck 110-3) about individual characteristics and/or a current state of each truck 110-1, 110-2, 110-3 of the platoon 100. Here, V2V communication techniques can be employed for communicating transportation vehicle status updates from slave trucks 110-1, 110-2 to master truck 110-3. Such status updates can include information about transportation vehicle parameters such as current transportation vehicle weight, current transportation vehicle braking power, current inter-vehicle-distance, current transportation vehicle speed, current tire condition, etc. The managing entity (e.g., truck 110-3) can then use these current transportation vehicle parameters for adapting the respective braking control settings/parameters for each truck 110 to the emergency situation 120. Status updates of each truck can be sent to the managing entity (e.g., truck 110-3) via respective status messages, either periodically or event driven (e.g., whenever a status changes), for example.

To inform the managing entity (e.g., truck 110-3) about the emergency situation 120, truck 110-1 may send an emergency message or signal in response to the detection 210 of the emergency situation 120 (see optional act 220). The emergency message may be sent to the managing entity (e.g., truck 110-3) only in some implementations. The skilled person having benefit from the present disclosure will appreciate that it might not be necessary to send the emergency message, if truck 110-1 itself was the managing entity of the platoon 100. Optionally, the emergency message may be broadcast to every participating truck 110-1, 110-2, 110-3 of the platoon 100. Upon receiving the emergency message, every truck 110-1, 110-2, 110-3 becomes aware of the emergency situation 120 and can initiate appropriate preparations. For example, the trucks 110-2, 110-3 (and truck 110-1 itself) may initiate a respective emergency braking and/or may start building up braking pressure in response to (receiving) the emergency message from truck 110-1.

Further, upon receiving the emergency message from truck 110-1, the managing entity (e.g., truck 110-3) may compute the most favorable braking control settings/parameters (e.g., respective amount of braking pressure to be applied) for one or more or even each truck 110-1, 110-2, 110-3 of the platoon 100. As mentioned before, the respective braking control settings/parameters may be computed based on most recent transportation vehicle parameters of the trucks 110-1, 110-2, 110-3. The respective braking control settings/parameters lead to individual braking behaviors of the different trucks 110-1, 110-2, 110-3. The skilled person having benefit from the present disclosure will appreciate that a truck of lower weight may need less braking power than a truck of higher weight, for example. In some examples, the braking control settings/parameters may also include steering commands for avoiding a rear-end collision with a preceding truck. Road and/or traffic conditions must allow for this option, of course.

Upon computing the individual braking control settings/parameters, the managing entity (e.g., truck 110-3) communicates the braking control settings/parameters to the respective truck such that the latter can adapt its braking settings according to the received settings/parameters from the managing entity (e.g., truck 110-3). In case braking pressure has already been built up (due to the preceding emergency message), adapting the braking power in the different trucks 110-1, 110-2, 110-3 in accordance with the commands from the managing entity (e.g., truck 110-3) can take place immediately.

Note that the detecting truck 110-1 may also act independently in some implementations. Since it is the one which detects the emergency situation, truck 110-1 may perform its emergency braking maneuver independently from the managing entity (e.g., truck 110-3) to achieve the quickest possible reaction and to avoid the obstacle. However, truck 110-1 may broadcast the emergency message to the other members of the platoon, in particular, to master truck 110-3, which then can coordinate the emergency braking of at least the remaining trucks 110-2, 110-3 of the platoon.

Figure 3:
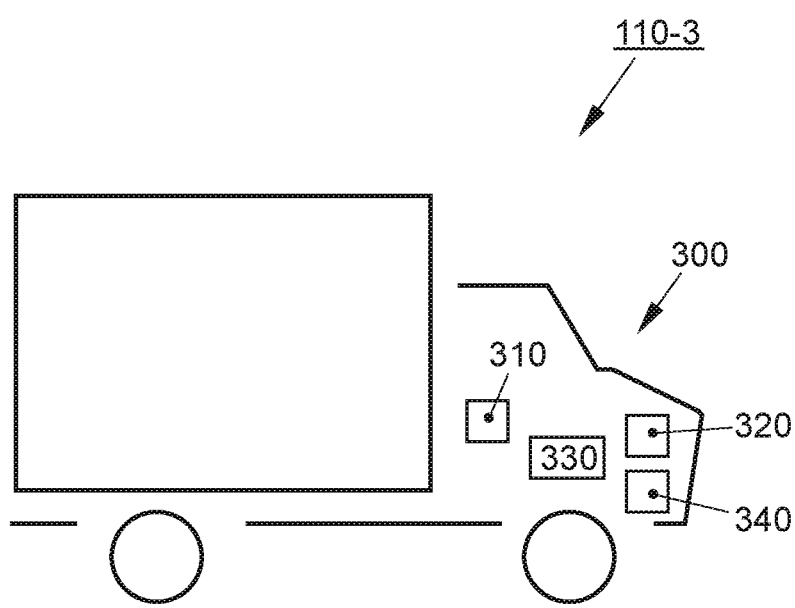
FIG. 3 illustrates a block diagram of a coordinating master transportation vehicle according to an exemplary embodiment.

FIG. 3 provides a schematic block diagram of a central managing entity 300 comprised of truck 110-3.

To act as central managing entity 300, truck 110-3 can have memory 310 configured to store individual characteristics and/or current states of other transportation vehicles 110-1, 110-2 of the platoon 100. Further, truck 110-3 is equipped with a receiver 320 configured to receive an emergency message from another transportation vehicle 110-1 of the platoon 100 (note that the receiver 320 may additionally be configured to receive status messages from other transportation vehicles). A digital processor 330 is configured to calculate, in response to the emergency message and based on the stored individual characteristics and/or current state of a transportation vehicle of the platoon 100, individual braking control parameters for the respective transportation vehicle. A transmitter 340 is configured to transmit the individual braking control parameters to the respective transportation vehicle. The skilled person having benefit from the present disclosure will appreciate that the receiver and transmitter can include radio receiver and transmitter circuitry, including low noise amplifiers, power amplifiers, analog-to-digital converters, digital-to-analog converters, antennas, etc. As mentioned before, the receiver and transmitter may be configured for V2X communication, cellular wireless communications, or a combination thereof.

The properties and features mentioned and described together with one or more of the previously detailed examples and figures, may as well be combined with one or more of the other examples to replace a like feature of the other example or to additionally introduce the feature to the other example.

Examples may further be or relate to a computer program having a program code for performing one or more of the above methods, when the computer program is executed on a computer or processor. Operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing of some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventors to furthering the art. All statements herein reciting principles, properties, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented as dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes or operations, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, or functions disclosed in the specification or claims may not be construed as to be within the specific order, unless explicitly or implicitly stated otherwise, for instance, for technical reasons. Therefore, the disclosure of multiple acts or functions will not limit these to a particular order unless such acts or functions are not interchangeable for technical reasons. Furthermore, in some examples a single act, function, process, or operation may include or may be broken into multiple sub-acts, -functions, -processes, or -operations, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

LIST OF REFERENCE SIGNS 100 vehicular platoon
110 Transportation vehicle, truck
120 emergency situation
200 method for coordinating an emergency braking of a platoon
210 detecting emergency situation
220 broadcasting emergency message
230 determining individual braking control parameters for one or more transportation vehicles of the platoon by an entity managing the platoon
240 communicating the individual braking control settings from the managing entity to the one or more transportation vehicles of the platoon
250 braking in accordance with respective individual braking control settings received from the managing entity
300 managing entity
310 memory
320 receiver
330 processor
340 transmitter

The invention claimed is:

1. A transportation vehicle comprising:
memory to store individual characteristics and/or current states of other transportation vehicles of a platoon of communicatively-coupled transportation vehicles;
a receiver to receive an emergency message from another transportation vehicle of the platoon;
a processor to calculate individual braking control parameters for the respective transportation vehicles of the platoon in response to the emergency message and based on the stored individual characteristics and/or current state of the transportation vehicles of the platoon; and
a transmitter to transmit the individual braking control parameters from the transportation vehicle to the respective transportation vehicles,
wherein an emergency situation is detected by a transportation vehicle of the platoon and the emergency message is broadcasted from that transportation vehicle to other transportation vehicles of the platoon in response to detecting the emergency situation, and
wherein braking pressure in the other transportation vehicles of the platoon is built up in response to receiving the emergency message from that transportation vehicle prior to the calculation of the individual braking control parameters.

2. The vehicle of claim 1, wherein the individual braking control settings are indicative of a respective braking power to be applied.

3. The vehicle of claim 1, wherein determination of individual braking control settings of the transportation vehicle is based on the individual characteristics and/or the current state of the respective transportation vehicle.

4. The vehicle of claim 3, wherein the individual characteristics and/or the current state comprise at least one of weight, braking power, inter-vehicle-distance, speed, and tire condition.

5. The vehicle of claim 1, wherein the vehicle is one of a plurality of transportation vehicles of the platoon that are autonomous or at least partially autonomous transportation vehicles.

6. The vehicle of claim 1, wherein the plurality of transportation vehicles of the platoon communicate via a vehicle-to-vehicle communication system.

7. A method for coordinating an emergency braking of a platoon of communicatively-coupled transportation vehicles, the method comprising:
detecting an emergency situation by a transportation vehicle of the platoon; and
broadcasting an emergency message from the transportation vehicle to other transportation vehicles of the platoon in response to detecting the emergency situation,
building up braking pressure in the other transportation vehicles of the platoon in response to receiving the emergency message from the transportation vehicle,
determining individual braking control settings, after building up braking pressure, for the transportation vehicles of the platoon by a managing entity managing the platoon in response to an emergency situation;
communicating the individual braking control settings from the managing entity to the transportation vehicles of the platoon; and braking by the one or more transportation vehicles of the platoon in accordance with the respective individual braking control settings received from the managing entity.

8. The method of claim 7, wherein the individual braking control settings are indicative of a respective braking power to be applied.

9. The method of claim 7, further comprising
informing the managing entity about individual characteristics and/or a current state of each transportation vehicle of the platoon.

10. The method of claim 9, wherein determining the individual braking control settings of a transportation vehicle is based on the individual characteristics and/or the current state of the respective transportation vehicle.

11. The method of claim 9, wherein the individual characteristics and/or the current state comprise at least one of weight, braking power, inter-vehicle-distance, speed, and tire condition.

12. The method of claim 7, wherein the plurality of transportation vehicles of the platoon are autonomous or at least partially autonomous transportation vehicles.

13. The method of claim 7, wherein the plurality of transportation vehicles of the platoon communicate via a vehicle-to-vehicle communication system.

14. The method of claim 7, wherein the managing entity is a transportation vehicle of the platoon acting as a master transportation vehicle for other transportation vehicles of the platoon acting as slave transportation vehicles.

15. A system of a plurality of communicatively-coupled transportation vehicles, the system comprising:
a first transportation vehicle to detect an emergency situation and to broadcast an emergency message to other transportation vehicles in response to the detected emergency situation;
a second transportation vehicle to determine respective braking control parameters for each of the additional transportation vehicles of the plurality and to send the respective individual braking control parameters to each of the additional transportation vehicles in response to the emergency message; and
wherein braking pressure in the second and additional transportation vehicles is built up in response to receiving the emergency message from the first transportation vehicle and prior to the receipt of the respective braking control parameters by each of the additional transportation vehicles.

* * * * *